UNITED STATES PATENT OFFICE.

HORACE W. LASH, OF CLEVELAND, OHIO.

PROCESS OF TREATING CAST-IRON WASTE.

978,906.  Specification of Letters Patent.  Patented Dec. 20, 1910.

No Drawing.  Application filed September 1, 1908.  Serial No. 451,190.

*To all whom it may concern:*

Be it known that I, HORACE W. LASH, a citizen of the United States, residing at Cleveland, in the county of Cuyahoga and State of Ohio, have invented a certain new and useful Improvement in Processes of Treating Cast-Iron Waste, of which the following is a full, clear, and exact description.

The object of the present invention is to provide a method of treating cast iron waste, such as cast iron borings and turnings and putting such material into a condition for conversion into steel by further treatment.

It is a well-known fact that finely divided material such as cast iron borings and turnings are not readily utilized in steel making except by some few special processes, since they are in a physical condition rendering them difficult to handle and also contain rather high percentages of silicon, sulfur and phosphorus. The difficulty of using finely divided cast iron in such processes is increased materially after the iron has been exposed to the weather and has become somewhat oxidized. I have discovered, however, that these partially oxidized, refractory and unmanageable cast iron borings may be transformed into a useful steel making material by fusing them in a furnace with a considerable portion of carbon and oxid of manganese, with or without lime.

In practice I make up a charge mixture comprising about 80 per cent. by weight of the cast iron borings or finely divided cast iron, about 15 per cent. of charcoal or coke dust and about 5 per cent. of black oxid of manganese. In charging this mixture, the furnace should be charged in the usual way, using a liberal quantity of limestone, say, an amount equal to ten or possibly fifteen per cent. of the total charge mixture. If desired, instead of charging limestone into the furnace, the same may be made a part of the charge mixture in the form of burnt lime. Other materials such as scrap or pig iron or additional fluxes may be added if desired without interfering with the process. Some suitable furnace such as a reverberatory melting furnace may be employed. A fusing heat is applied and it is thereupon found that the iron contained in the oxidized portion of the borings is recovered and a substantial reduction in the silicon, sulfur and phosphorus in the cast iron is made.

In the initial stages of the fusion a portion of the manganese oxid present will be found to unite with some of the sulfur of the cast iron, forming manganese sulfate which passes into the slag. The manganese oxid which is not utilized in this manner is reduced partially by the carbon present and partially by the silicon of the cast iron, and the maganese resulting therefrom is retained in the material forming the final product, lending to it such valuable properties as may flow from the presence thereof. There being a large excess of carbon present, the carbon will effectively reduce the oxidized portion of the borings recovering the metal therefrom so that it will form part of the bath, and the excess of the carbon will be retained in the bath giving a highly carburized product, it being desirable to have the carbon content of the product reach the highest possible point, even that of saturation if possible. The resultant product will be a metal very high in manganese and combined carbon, with a substantial reduction in sulfur, silicon and phosphorus, and quite suitable for converting into steel by further treatment, either directly or by treatment in a secondary furnace. An average sample of the product will contain, for example, 3 to 4 per cent. of carbon, most of which will be, in the combined state, about 1 per cent. of manganese and about ½ per cent. silicon, the reduction of sulfur and phosphorus depending upon the amount present in the particular cast iron being used.

Having thus described my invention, I claim:

1. The process which comprises fusing a mixture of cast iron borings or turnings with carbon and black oxid of manganese.

2. The process which consists in subjecting a mixture of cast iron borings or turnings, carbon and black oxid of manganese, to the action of a fusing heat and continuing the heating until the molten iron is high in carbon and manganese and low in silicon, phosphorus and sulfur.

In testimony whereof, I hereunto affix my signature in the presence of two witnesses.

HORACE W. LASH.

Witnesses:
J. M. WOODWARD,
H. R. SULLIVAN.